(12) United States Patent
Yasui et al.

(10) Patent No.: US 8,338,009 B2
(45) Date of Patent: Dec. 25, 2012

(54) BATTERY AND BATTERY UNIT

(75) Inventors: Shunsuke Yasui, Osaka (JP); Toshiki Itoi, Nara (JP); Daisuke Kishii, Osaka (JP); Shinya Geshi, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/119,608

(22) PCT Filed: Jul. 9, 2010

(86) PCT No.: PCT/JP2010/004477
§ 371 (c)(1),
(2), (4) Date: Mar. 17, 2011

(87) PCT Pub. No.: WO2011/007532
PCT Pub. Date: Jan. 20, 2011

(65) Prior Publication Data
US 2011/0171504 A1    Jul. 14, 2011

(30) Foreign Application Priority Data
Jul. 17, 2009    (JP) ................ 2009-168521

(51) Int. Cl.
  *H01M 2/30*    (2006.01)
  *H01M 2/12*    (2006.01)
  *H01M 2/24*    (2006.01)
(52) U.S. Cl. ............... 429/53; 429/55; 429/56; 429/82; 429/123; 429/158; 429/163; 429/169; 429/170; 429/181
(58) Field of Classification Search ................... 429/53, 429/55, 121, 148, 163, 166, 169, 171, 180, 429/56, 82, 158, 123, 170, 181
See application file for complete search history.

(56) References Cited

U.S. PATENT DOCUMENTS

| | | | |
|---|---|---|---|
| 2,411,272 A * | 11/1946 | Keller | ............ 429/170 |
| 3,664,878 A | 5/1972 | Amthor | |
| 4,079,172 A * | 3/1978 | Potts et al. | ............ 429/54 |
| 4,207,385 A | 6/1980 | Hayama | |
| 4,407,914 A | 10/1983 | Inoue et al. | |

(Continued)

FOREIGN PATENT DOCUMENTS

JP    2-7862    1/1990

(Continued)

OTHER PUBLICATIONS

European Search Report issued in European Patent Application No. EP 10799596.1 dated Aug. 8, 2011.

*Primary Examiner* — Ula C Ruddock
*Assistant Examiner* — Amanda Barrow
(74) *Attorney, Agent, or Firm* — McDermott Will & Emery LLP

(57) ABSTRACT

A battery (3) includes a battery case (10) having an opening sealed with a sealing plate (13). The sealing plate (13) has a protrusion (13a) extending in a direction toward the outside of the battery case (10), and a ring-shaped insulator (32) is provided on an outer circumferential surface of the protrusion (13a). An inner circumferential portion (32e) of the insulator (32) is in contact with the outer circumferential surface (13b) of the protrusion (13a), and an outer circumferential portion (32d) of the insulator (32) is extended to be positioned on an opening end (10a) of the battery case (10).

8 Claims, 6 Drawing Sheets

U.S. PATENT DOCUMENTS

| | | | |
|---|---|---|---|
| 5,795,674 A | 8/1998 | Shiota | |
| 5,849,431 A * | 12/1998 | Kita et al. | 429/164 |
| 6,248,473 B1 * | 6/2001 | Lonsberry | 429/169 |
| 7,572,544 B2 * | 8/2009 | Kozuki et al. | 429/53 |
| 2004/0009394 A1 * | 1/2004 | Ito et al. | 429/206 |
| 2004/0265683 A1 * | 12/2004 | Merrill et al. | 429/56 |
| 2005/0271933 A1 * | 12/2005 | Matsumoto et al. | 429/127 |
| 2006/0263684 A1 * | 11/2006 | Song | 429/180 |
| 2008/0131768 A1 * | 6/2008 | Lee | 429/174 |

FOREIGN PATENT DOCUMENTS

| | | | |
|---|---|---|---|
| JP | 06-44022 | | 6/1994 |
| JP | 08-195189 | * | 7/1996 |
| JP | 2001-243937 | | 9/2001 |
| JP | 2002-075323 | | 3/2002 |
| JP | 2003-077453 | | 3/2003 |
| JP | 2003-158303 | * | 6/2004 |
| JP | 2004-158303 | | 6/2004 |
| JP | 2006-190611 | | 7/2006 |

* cited by examiner (a)

(b)

(a)

(b)

BATTERY AND BATTERY UNIT

RELATED APPLICATIONS

This application is the U.S. National Phase under 35 U.S.C. §371 of International Application No. PCT/JP2010/004477, filed on Jul. 9, 2010, which in turn claims the benefit of Japanese Application No. 2009-168521, filed on Jul. 17, 2009, the disclosures of which Applications are incorporated by reference herein.

TECHNICAL FIELD

The present invention relates a battery, and a battery unit (a battery pack).

BACKGROUND ART

A battery unit includes a plurality of batteries which are electrically connected (Patent Publication 1).

Each of the batteries constituting the battery unit includes, for example, a battery case having an opening, a sealing plate for sealing the opening, and an electrode group placed in the battery case. A positive electrode of the electrode group is connected to a positive electrode terminal of the battery (e.g., the sealing plate), and a negative electrode of the electrode group is connected to a negative electrode terminal of the battery (e.g., the battery case).

CITATION LIST

Patent Document

[Patent Document 1] Japanese Utility Model Publication No. H02-7862

SUMMARY OF THE INVENTION

Technical Problem

For example, according to Patent Document 1, adjacent batteries are connected through a battery connector which is provided near openings of the battery cases. In such a battery unit, relative to the battery shown on the right in FIG. 1(b) of Patent Document 1, a battery connector connected to the sealing plate of one of adjacent batteries, and a battery connector connected to the battery case of the other adjacent battery are arranged close to each other at the openings of the battery cases. When the two battery connectors contact in one of the batteries, a short circuit occurs between the positive and negative electrode terminals of the battery. To prevent the occurrence of the short circuit, an insulator for insulating the sealing plate and the battery case is preferably provided near the opening of the battery case of the battery.

However, it is sometimes difficult to ensure space for providing the insulator near the opening of the battery case. When the insulator is provided in space which is not large enough, working efficiency may be reduced. Thus, in general, an insulating sheet is provided to contact both of the sealing plate and an opening end of the battery case, and the insulating sheet is fixed by an insulating tube covering an outer surface of the battery case.

This is not unique to the batteries constituting the battery unit, but is applied to batteries which are used alone or in combination of a couple of batteries (e.g., power sources for mobile electronic devices). Specifically, in most batteries, the insulating sheet is provided to contact both of the sealing plate and the opening end of the battery case, irrespective of whether the batteries constitute the battery unit or not, and the insulating sheet is fixed by the insulating tube. This can prevent connection between the sealing plate and the battery case through a metal piece which accidentally enters the battery.

Recently, in view of cost reduction of the batteries, disuse of the insulating tube for covering the outer surface of the battery case is being considered. However, if the outer surface of the battery case is not covered with the insulating tube etc., the insulating sheet cannot be fixed at the predetermined position, and an external short circuit may possibly occur.

In view of the foregoing, the present invention has been achieved. An object of the present invention is to provide a battery which can reduce the occurrence of the external short circuit at low cost.

Solution to the Problem

A battery of the present invention includes: a battery case having an opening sealed with a sealing plate. The sealing plate has a protrusion extending in a direction toward the outside of the battery case. A ring-shaped insulator is provided on an outer circumferential surface of the protrusion. An inner circumferential portion of the insulator is in contact with the outer circumferential surface of the protrusion, and an outer circumferential portion of the insulator is extended to be positioned on an opening end of the battery case.

The "opening end of the battery case" includes a shoulder of the battery case near the opening, and includes part of the battery case close to the sealing plate than to the shoulder of the battery case near the opening.

In this configuration, the insulator is extended from the outer circumferential surface to be positioned on the opening end of the battery case. This can prevent a metal piece etc. from entering space between the protrusion and the opening end of the battery case.

In this configuration, the inner circumferential portion of the insulator is in contact with the outer circumferential surface of the protrusion. Thus, the insulator can be fixed to a predetermined position without using a fixing member (e.g., an insulating tube).

Advantages of the Invention

The present invention can provide a battery which can reduce the occurrence of the external short circuit at low cost.

DESCRIPTION OF EMBODIMENTS

Embodiments of the present invention will be described in detail with reference to the drawings. The present invention is not limited to the following embodiments. In the following description, a direction from the inside of a battery case to an opening of the battery case will be referred to as a "direction toward the outside of the battery," and a direction from the opening of the battery case to the inside of the battery case will be referred to as a "direction toward the inside of the battery case."

First Embodiment

Figure 1:
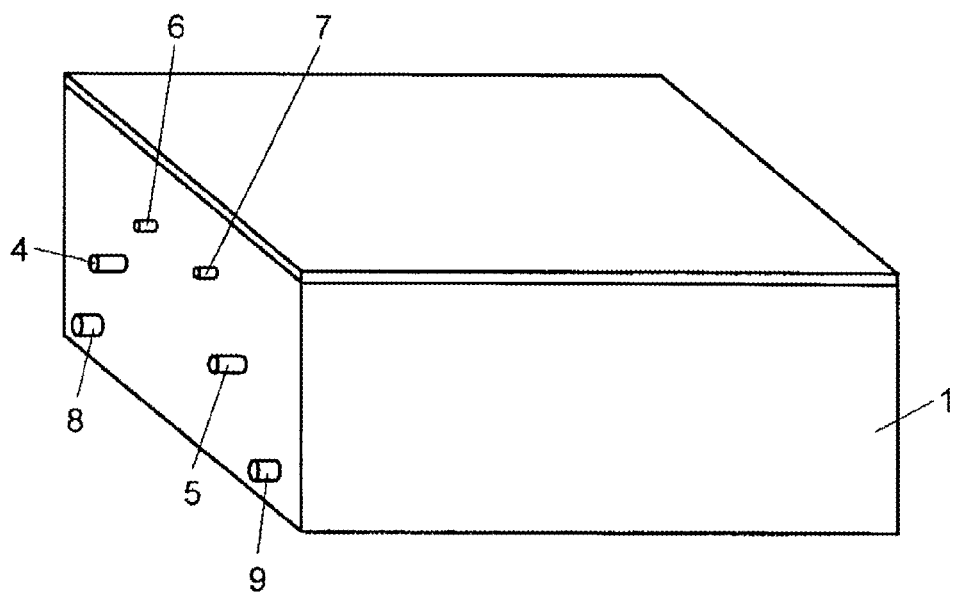
FIG. 1 is a perspective view illustrating a battery module (a battery device) according to an embodiment of the present invention.
Figure 2:
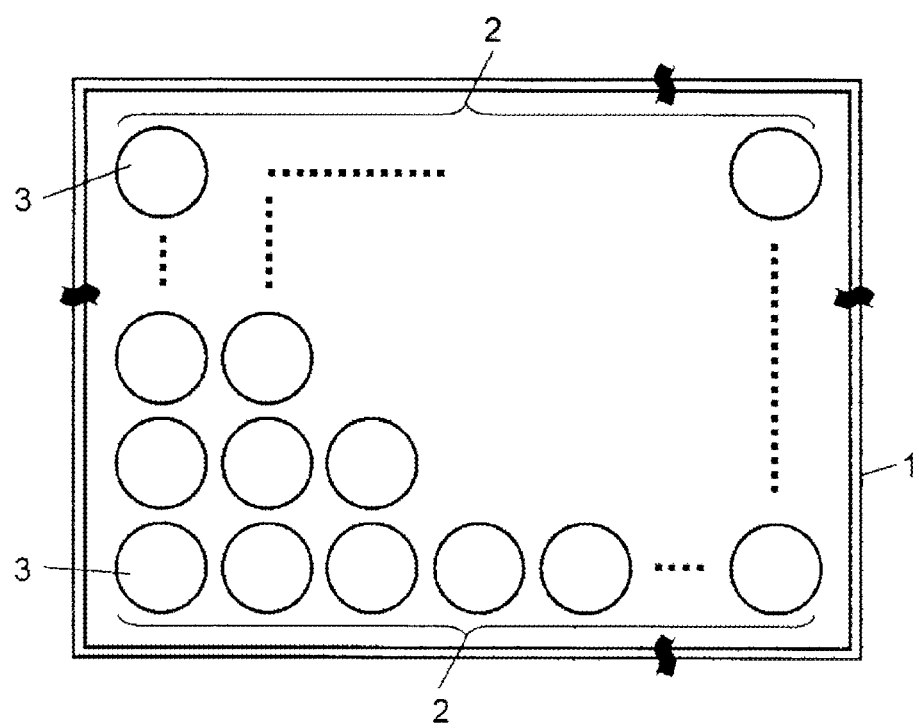
FIG. 2 is a plan view of the battery module shown in FIG. 1.

The structure of a battery module of a first embodiment of the present invention will be described below. FIG. 1 is a perspective view of the battery module of the present embodiment. FIG. 2 is a plan view of the battery module shown in FIG. 1. The battery module includes a case body 1. The case body 1 is in the shape of a box which is rectangular when viewed in plan.

As shown in FIG. 2, seven battery units 2 are arranged parallel to each other in the case body 1.

In each of the battery units 2, twenty cylindrical batteries 3 are arranged in a row (in the longitudinal direction of the case body 1) in such a manner that sealing plates (positive electrodes) 13 (see FIG. 3) face the same direction. The sealing plates 13 (see FIG. 3) of the cylindrical batteries 3 are connected to each other, and battery cases 10 (see FIG. 3) of the cylindrical batteries 3 are connected to each other. Thus, the twenty cylindrical batteries 3 are connected in parallel in each of the battery units 2. Therefore, when a single cylindrical battery 3 has an electromotive force of 3.6 V, the battery unit 2 also has an electromotive force of 3.6 V.

Figure 4:
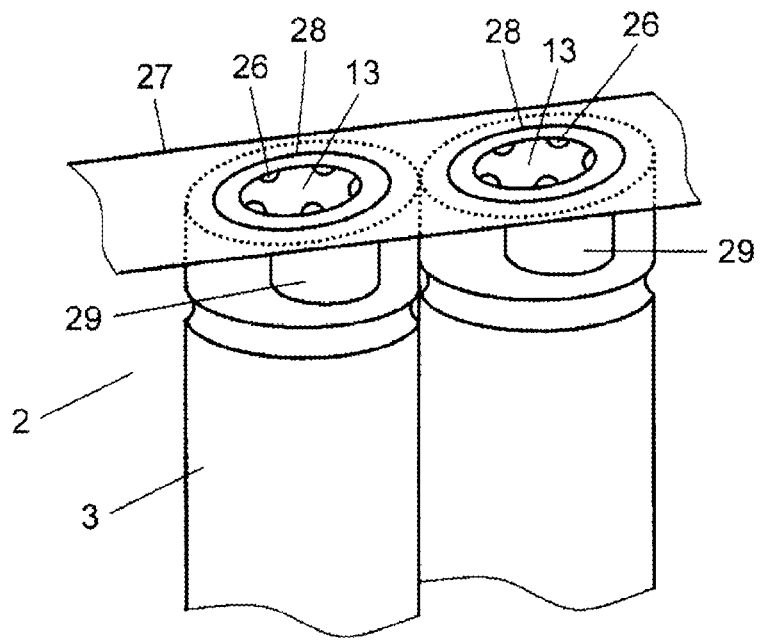
FIG. 4 is a perspective view illustrating a structure for connecting negative electrodes in the battery unit according to the embodiment of the present invention.

In adjacent battery units 2, a positive electrode connecting plate (an electrode plate) 33 of one of the adjacent battery units 2 (see FIG. 5) is connected to a negative electrode connecting plate (an electrode plate) 27 of the other battery unit 2 (see FIG. 4). Specifically, the adjacent battery units 2 are connected in series. Thus, when the battery unit 2 has an electromotive force of 3.6 V, the battery module has an electromotive force of 25.2 V because the seven battery units 2 are connected in series in the battery module.

The electromotive force of 25.2 V obtained in this manner is extracted through an electrode terminal 4 and an electrode terminal 5 provided on an outer surface of the case body 1 shown in FIG. 1.

In FIG. 1, a control terminal 6 and a control terminal 7 for controlling charge/discharge of the cylindrical batteries 3 are provided above the electrode terminals 4 and 5.

In FIG. 1, an inlet 8 and an outlet 9 of cooling water are provided below the electrode terminals 4 and 5. The cylindrical batteries 3 are cooled by the cooling water fed into the case body 1 through the inlet 8, and the cooling water which cooled the cylindrical batteries 3, and is increased in temperature is discharged out of the case body 1 through the outlet 9. After the cooling water discharged out of the case body 1 is reduced in temperature, the cooling water is fed again into the case body 1 through the inlet 8.

Figure 3:
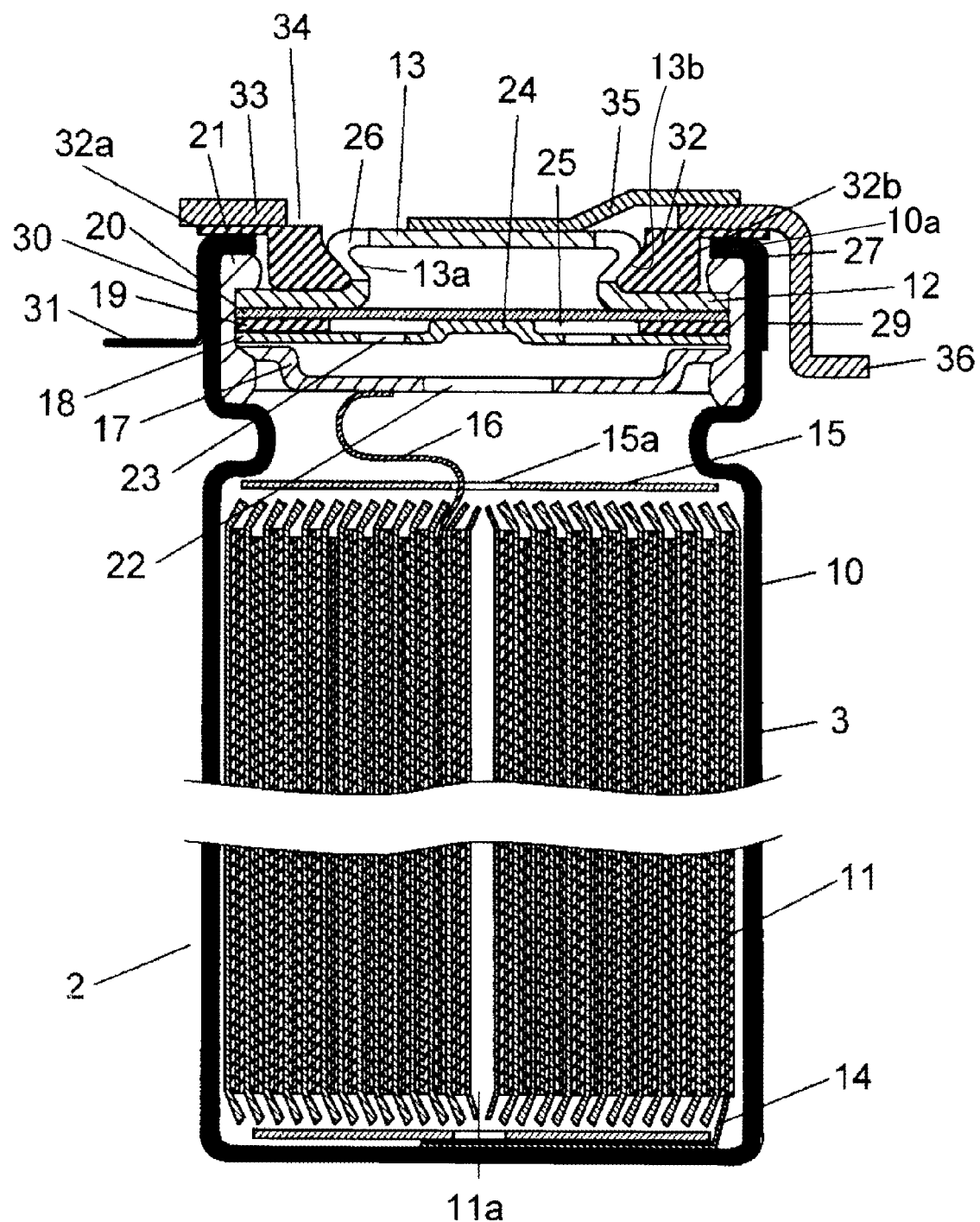
FIG. 3 is a longitudinal cross-sectional view illustrating a battery constituting a battery unit according to the embodiment of the present invention.

The structure of each of the cylindrical batteries 3 will be described first, and then the structure of the battery unit 2 will be described. FIG. 3 is a longitudinal cross-sectional view of the cylindrical battery 3.

As shown in FIG. 3, the cylindrical battery 3 of the present embodiment includes a cylindrical battery case 10 having an opening at one end (an upper end in FIG. 3) and a closed bottom, an electrode group 11 placed in the battery case 10, a sealing assembly 12 (a sealing) which covers the opening of the battery case 10, and a sealing plate 13 constituting the sealing assembly 12.

The battery case 10 is made of a conductive material (for example, metal). An outer surface of the battery case 10 is not covered with a resin tube etc. Thus, the entire part of the outer surface of the battery case 10 serves as a negative electrode terminal of the cylindrical battery 3.

The electrode group 11 includes a positive electrode, and a negative electrode wound with a separator interposed therebetween. Reference characters are not given to the positive and negative electrodes and the separator for easy description of the figure.

The negative electrode of the electrode group 11 is welded to a bottom surface of the battery case 10 with a negative electrode lead 14 interposed therebetween, and the negative electrode is electrically and mechanically connected to the bottom surface of the battery case 10. Thus, the battery case 10 serves as the negative electrode terminal of the cylindrical battery 3 as described above.

In welding the negative electrode lead 14 to an inner part of the bottom surface of the battery case 10, a welding electrode (not shown) is inserted in a hollow part 11a of the electrode group 11, and the negative electrode lead 14 pressed onto the bottom surface of the battery case 10 is welded to the bottom surface with the welding electrode before an upper end surface of the electrode group 11 in FIG. 3 is covered with the sealing assembly 12.

After the negative electrode lead 14 is welded to the bottom surface of the battery case 10, an insulator 15 is inserted in the battery case 10 from the opening of the battery case 10, and is placed on the upper end surface of the electrode group 11.

A through hole 15a is formed in the center of the insulator 15. A positive electrode lead 16 connected to the positive electrode of the electrode group 11 is allowed to pass through the through hole 15a of the insulator 15, and is drawn toward the opening of the battery case 10.

The sealing assembly 12 includes a metal plate 17, a metal plate 18, an insulator 19, a metal valve plate 20, and a sealing plate 13 which are stacked in this order in the direction toward the outside of the battery case 10. A packing 21 is provided around the outer circumference of the sealing assembly 12.

The structure of the sealing assembly 12 will be described in further detail. An upper end of the positive electrode lead 16 is electrically connected to a lower surface of the metal plate 17, a through hole 22 is formed in the center of the metal plate 17, and the periphery of an upper surface of the metal plate 17 is electrically connected to a lower surface of the metal plate 18.

A through hole 23 is also formed in the metal plate 18, and a protrusion 24 protruding toward the opening of the battery case 10 is provided in the center of the metal plate 18. The protrusion 24 passes through a through hole 25 formed in the center of the insulator 19, and is in contact with the center of a lower surface of the metal valve plate 20.

When a pressure inside the battery case 10 exceeds a predetermined value, the pressure is relieved from the inside of the battery case through the through holes 22 and 23 of the metal plates 17 and 18 to break the metal valve plate 20, and is relieved outside the battery case through vents 26 of the sealing plate 13. When the metal valve plate 20 breaks, the metal plate 17, the metal plate 18, and the sealing plate 13 which are connected through the metal valve plate 20 are no longer electrically connected.

Figure 5:
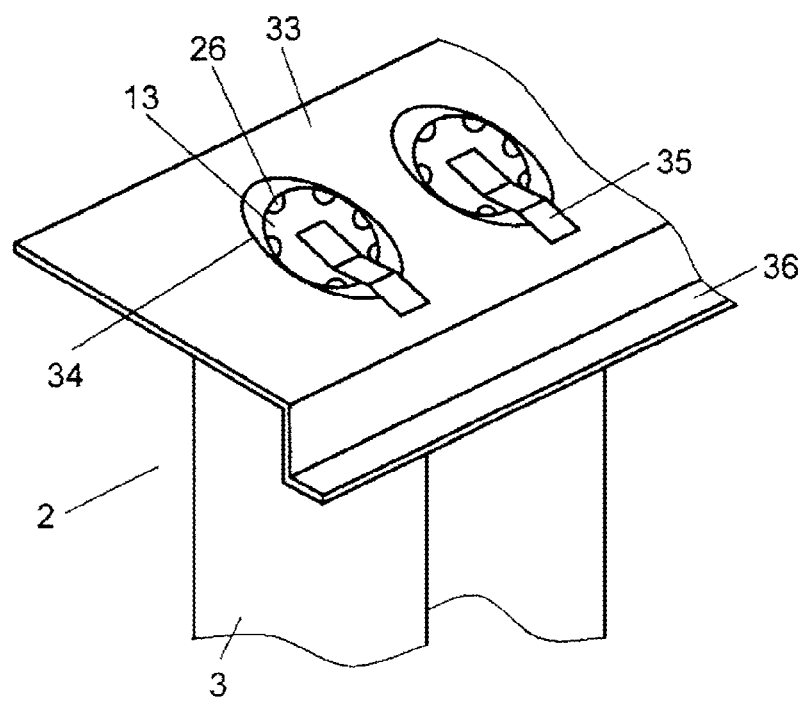
FIG. 5 is a perspective view illustrating a structure for connecting positive electrodes in the battery unit according to the embodiment of the present invention.

The structure of the battery unit 2 will be described below. FIG. 4 is a perspective view illustrating the structure for connecting the negative electrodes in the battery unit 2, and FIG. 5 is a perspective view illustrating the structure for connecting the positive electrodes in the battery unit 2. In the battery unit 2, the battery cases 10 are connected in parallel through a negative electrode connecting plate 27, and the sealing plates 13 are connected in parallel through a positive electrode connecting plate 33.

In each of the battery unit 2, twenty cylindrical batteries 3 are arranged in a row in such a manner that the sealing plates 13 face the same direction. A strip-shaped negative electrode connecting plate (an electrode plate) 27 is placed on opening ends of the battery cases 10.

The negative electrode connecting plate 27 includes through holes 28, welding tabs 29, and welding tabs 30 which are provided to correspond to the cylindrical batteries 3 (see FIGS. 3 and 4).

Each of the through holes 28 exposes the sealing plate 13 of the cylindrical battery 3, and vents 26 formed in the sealing plate 13. This can prevent contact between the sealing plate 13 and the negative electrode connecting plate 27, and can ensure a path for discharging gas generated in the cylindrical batteries 3 outside.

As shown in FIGS. 3 and 4, the welding tabs 29 are provided at one of lateral ends of the negative electrode connecting plate 27, and the welding tabs 30 are provided at the other lateral end of the negative electrode connecting plate 27. The welding tabs 29 and 30 are wrapped around, and are welded to the outer circumferential surfaces of the battery cases 10. Thus, in the battery unit 2, the battery cases 10 of the cylindrical batteries 3 are connected to the negative electrode connecting plate 27 through the welding tabs 29 and 30.

Lower ends of the welding tabs 30 extend in a direction away from the outer circumferential surfaces of the battery cases 10 (e.g., in the horizontal direction), and serve as connecting portions 31. The connecting portions 31 are connected to the positive electrode connecting plate 33 of the adjacent battery unit 2.

The negative electrode connecting plate 27 is preferably as thick as, or thinner than the battery case 10. This can reduce stress on the battery cases 10 in welding the negative electrode connecting plate 27 to the battery cases 10.

Figure 6:
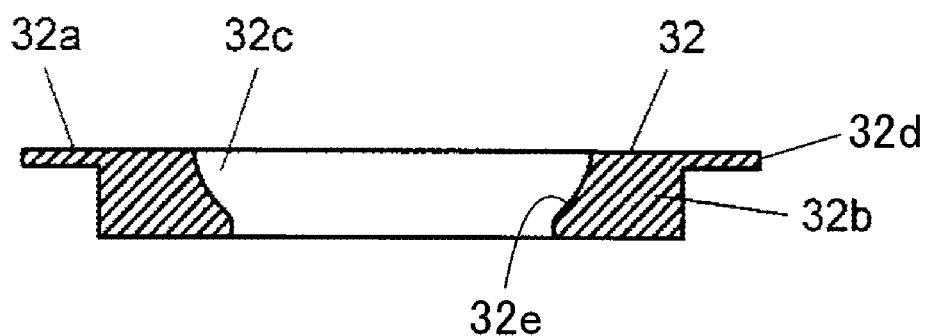
FIG. 6(a) is a cross-sectional view illustrating an insulator according to the embodiment of the present invention.
FIG. 6(b) is a plan view of the insulator.
Figure 6:
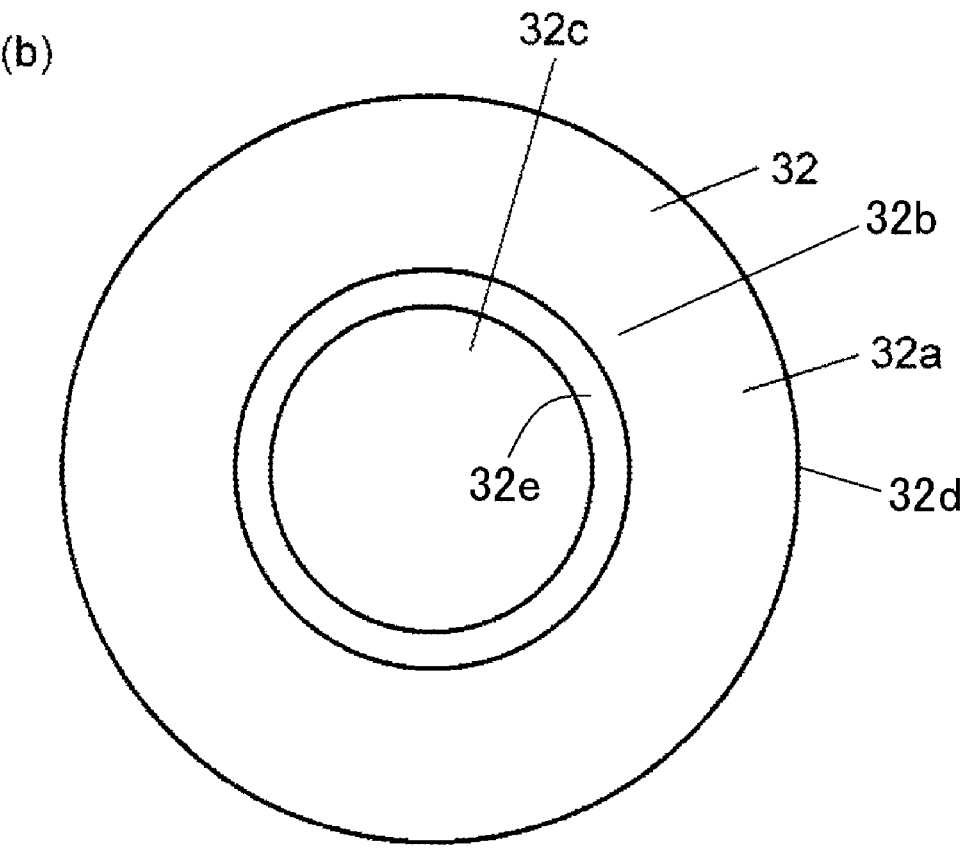

A thin part (an extension part) 32a of an insulator 32 (described below) shown in FIG. 6 is placed on the negative electrode connecting plate 27. The strip-shaped positive electrode connecting plate (an electrode plate) 33 shown in FIGS. 3 and 5 is placed on the thin part 32a. This can prevent a short circuit between the negative electrode connecting plate 27 and the positive electrode connecting plate 33.

As shown in FIG. 5, through holes 34 are formed in the positive electrode connecting plate 33 to correspond to the cylindrical batteries 3. Each of the through holes 34 exposes the sealing plate 13 of the cylindrical battery 3 and the vents 26. This can ensure a path for discharging the gas generated in the cylindrical batteries 3 outside.

The positive electrode connecting plate 33 is connected to the sealing plates 13 of the cylindrical batteries 3 through connecting plates 35. Specifically, an end of each of the connecting plates 35 is welded to the positive electrode connecting plate 33, and the other end of the connecting plate 35 is welded to the sealing plate 13 (part of the sealing plate exposed from the through hole 34).

A connecting portion 36 is connected to one of lateral ends of the positive electrode connecting plate 33. The connecting portion 36 is positioned below the positive electrode connecting plate 33, and is connected to the negative electrode connecting plate 27 of the adjacent battery unit 2.

The positive electrode connecting plate 33 is thicker than the battery case 10. This can reduce a resistance of the positive electrode connecting plate 33 as much as possible. The connecting plate 35 is thinner than the positive electrode connecting plate 33.

The battery unit 2 is connected in series to the adjacent battery unit 2. Specifically, the connecting portion 31 of the negative electrode connecting plate 27 of the battery unit 2 is brought into contact with the connecting portion 36 of the positive electrode connecting plate 33 of the adjacent battery unit 2, and the connecting portions 31 and 36 in contact with each other are welded.

As described above, the cylindrical batteries 3 in the battery unit 2 are connected in parallel, and there is no need to insulate the battery cases 10. Thus, the metal cans constituting the outer surfaces of the battery cases 10 are not covered with an insulating tube etc., but are naked. Thus, upper portions of the side surfaces of the battery cases 10 function as the negative electrode, and wires for parallel-connecting the cylindrical batteries 3 (e.g., the negative electrode connecting plate 27 etc.) can be converged near the openings of the battery case 10. This can simplify the wiring of the battery unit 2, thereby downsizing the battery unit 2.

In the battery unit 2, when a coolant (not shown) for cooling the cylindrical batteries 3 is arranged in contact with the cylindrical batteries 3, the coolant can be brought into contact with the side surfaces of the battery cases 10 without the insulating tube etc. interposed therebetween. This allows cooling of the cylindrical batteries 3 with improved efficiency. As to the respective cylindrical batteries 3, the battery case 10 does not have to be covered with the insulating tube etc. This can reduce the cost of the respective cylindrical batteries 3.

When the outer surface of the battery case 10 is not covered with the insulating tube etc. like the cylindrical batteries 3 of the present embodiment, it is difficult to fix the insulating sheet at the predetermined position (to contact both of the sealing plate and the opening end of the battery case). On the other hand, when the insulating sheet is not provided to contact both of the sealing plate 13 and the opening end 10a of the battery case 10, it is difficult to prevent the occurrence of the external short circuit in the cylindrical battery 3. In view of the foregoing, the inventors of the present invention have sought to fix the insulator at the predetermined position without using a fixing member such as the insulating tube etc., and have conceived the following insulator 32. The structure of the sealing plate 13 will be described first, and then the insulator 32 will be described.

As shown in FIG. 3, the sealing plate 13 includes a peripheral portion near an peripheral edge of the opening of the battery case 10, and a protrusion 13a extending from the peripheral portion in the direction toward the outside of the battery case 10. Thus, the protrusion 13a is positioned outside the battery case 10 relative to the peripheral portion, and functions as a positive electrode terminal of the cylindrical battery 3. For example, in producing the battery unit 2, the protrusion 13a functions as the positive electrode (the positive electrode connecting plate 33 is connected to the protrusion 13a through the connecting plate 35) as shown in FIG. 3. The vents 26 are formed in an upper part of a side surface of the protrusion 13a.

An outer diameter of the protrusion 13a is gradually reduced in the direction toward the inside of the battery case 10. The insulator 32 is provided on the outer circumferential surface of the protrusion 13a. FIG. 6(a) is a cross-sectional view of the insulator 32, and FIG. 6(b) is a plan view of the insulator 32.

The insulator 32 is made of an elastic material having an electrically insulating property, such as rubber, and is in the shape of a ring as shown in FIG. 6(b). In other words, a through hole 32c is formed in the insulator 32 to penetrate the insulator 32 in the thickness direction as shown in FIG. 6(a). The insulator 32 includes a thin part (an extension part) 32a near an outer circumference thereof, and a thick part (a fitting part) 32b near an inner circumference thereof as shown in FIGS. 3 and 6(a).

As shown in FIG. 3, the thick part 32b is provided on the peripheral portion of the sealing plate 13, and is positioned radially inside the opening end 10a of the battery case 10. An inner circumferential portion 32e of the insulator 32 (an inner circumferential surface of the thick part 32b, or a side surface of the through hole 32c) is in close contact with an outer circumferential surface 13b of the protrusion 13a of the sealing plate 13. Since the outer diameter of the protrusion 13a is gradually reduced in the direction toward the inside of the battery case 10, an inner diameter of the inner circumferential portion 32e of the insulator 32 is also gradually reduced in the direction toward the inside of the battery case 10. At a base of the protrusion 13a (a boundary between the peripheral portion and the protrusion 13a of the sealing plate 13 where the outer diameter of the protrusion 13a is the smallest), the thick part 32b of the insulator 32 is fitted to the protrusion 13a. This can prevent detaching of the insulator 32 from the protrusion 13a. Thus, the insulator 32 is fixed to the outer circumferential surface of the protrusion 13a without using a fixing member, such as the insulating tube etc.

The thin part 32a of the insulator 32 covers the opening end 10a of the battery case 10 as shown in FIG. 3, thereby stably bringing the inner circumferential portion 32e of the insulator 32 into close contact with the outer circumferential surface 13b of the protrusion 13a. In addition, the thin part 32a is provided between the negative electrode connecting plate 27 and the connecting portion 36 in the battery unit 2 as shown in FIG. 3, thereby preventing a short circuit between the positive and negative electrodes in the battery unit 2. Further, in the battery unit 2, the thin part 32a can absorb variations in height of the cylindrical batteries 3. Thus, the negative electrode connecting plate 27, the positive electrode connecting plate 33, etc. can be arranged substantially horizontally.

In the present embodiment, the inner circumferential portion 32e of the insulator 32 is in close contact with the outer circumferential surface 13b of the protrusion 13a, and an outer circumferential portion 32d (an outer circumferential surface of the thin part 32a) is extended to be positioned on the battery case 10. This can avoid contact between the opening end 10a of the battery case 10 and the protrusion 13a. Further, a metal piece etc. can be prevented from entering space between the opening end 10a of the battery case 10 and the protrusion 13a. Thus, the insulator 32 can electrically insulate the battery case 10 and the sealing plate 13, thereby preventing the occurrence of the external short circuit.

The insulator 32 is provided not to block the vents 26. Thus, the path for discharging the gas generated in the cylindrical batteries 3 outside is ensured.

To bring the insulator 32 into close contact with the outer circumferential surface 13b of the protrusion 13a, the insulator 32 is placed on the protrusion 13a, and then the insulator 32 is pushed down in the direction toward the inside the battery case 10. The insulator 32 is made of an elastic material such as rubber etc., and part of the protrusion 13a near the opening of the battery case 10 has the largest outer diameter. Thus, the thick part 32b of the insulator 32 is stretched radially outward by the protrusion 13a (the diameter of the through hole 32c is increased), and the inner circumferential portion 32e of the insulator 32 is brought into close contact with the outer circumferential surface 13b of the protrusion 13a as shown in FIG. 3.

Since the outer diameter of the protrusion 13a is gradually reduced in the direction toward the inside of the battery case 10, the inner circumferential portion 32e of the insulator 32 is fitted to the protrusion 13a at the base of the protrusion 13a.

Further, the inner diameter of the inner circumferential portion 32e of the insulator 32 is gradually increased in the direction toward the outside of the battery case 10. This can prevent the insulator 32 from blocking the vents 26 of the sealing plate 13.

As described above, the cylindrical battery 3 has the insulator 32. This can reduce the occurrence of the external short circuit without using a member for fixing the insulator 32. Thus, in the present embodiment, the battery in which the occurrence of the external short circuit is reduced can be produced at low cost.

In the present embodiment, the cylindrical batteries 3 have been described as the batteries constituting the battery unit 2. However, the cylindrical batteries 3 are not limited to the batteries constituting the battery unit 2, but may be batteries capable of driving the mobile electronic devices (e.g., cellular phones) alone or in combination of a couple of batteries. The same is applied to the following second embodiment.

Second Embodiment

In a second embodiment, an extension part (an outer circumferential portion) and a fitting part (an inner circumferential portion) of the insulator have substantially the same thickness. A difference between the second embodiment and the first embodiment will be described below.

Figure 7:
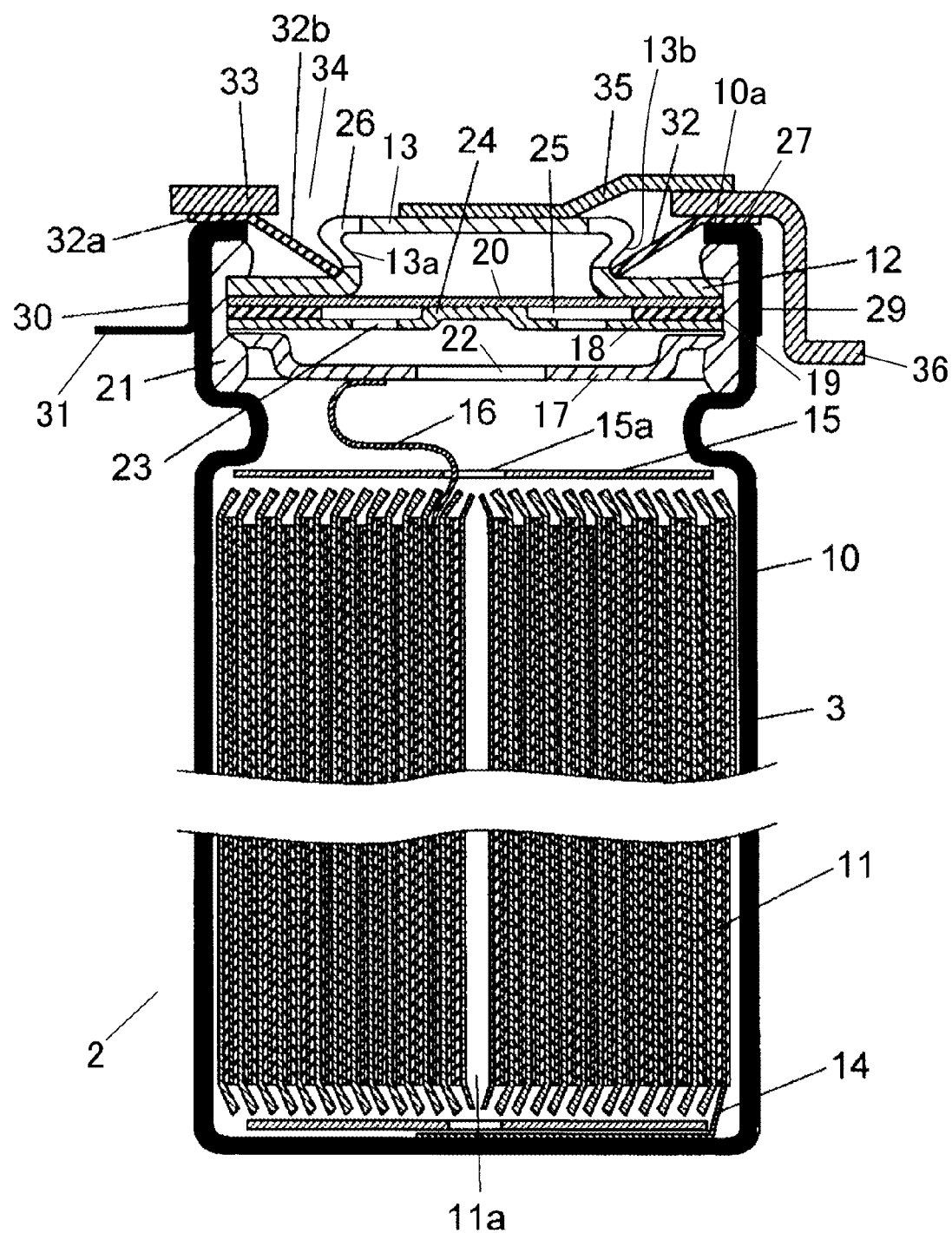
FIG. 7 is a longitudinal cross-sectional view illustrating a battery unit of another embodiment of the present invention.
Figure 8:
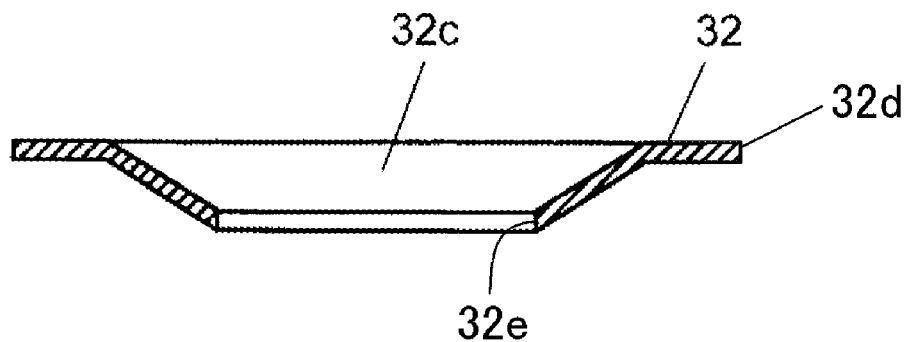
FIG. 8(a) is a cross-sectional view of an insulator of another embodiment of the present invention.
FIG. 8(b) is a plan view of the insulator.
Figure 8:
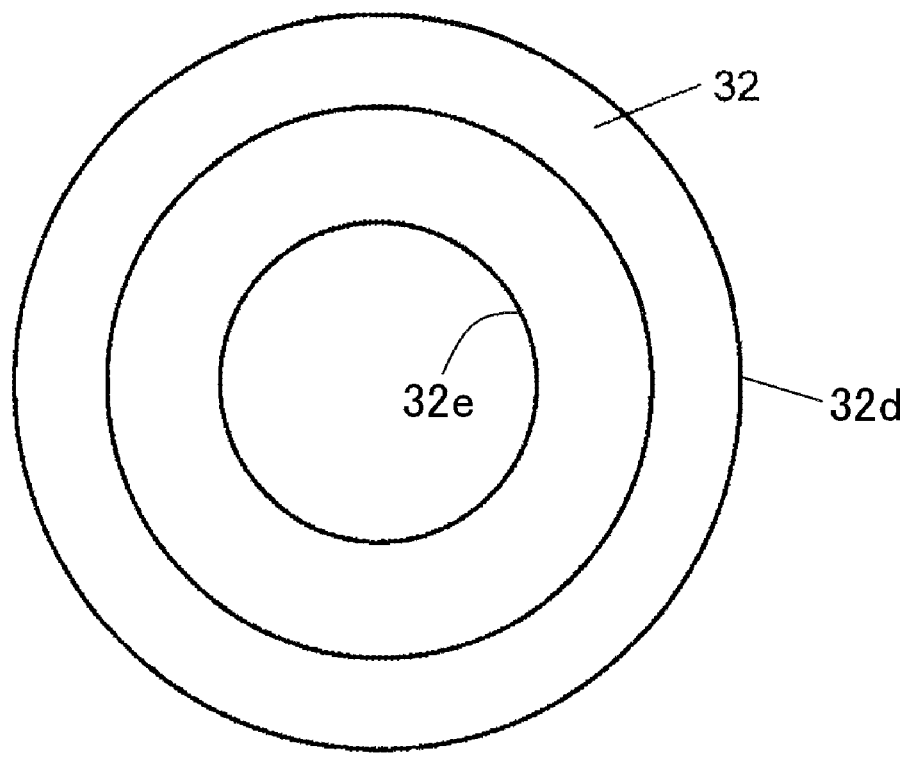

FIG. 7 is a longitudinal cross-sectional view illustrating a cylindrical battery 3 constituting a battery unit 2. FIG. 8(a) is a cross-sectional view of an insulator 32, and FIG. 8(b) is a plan view of the insulator 32.

The insulator 32 of the present embodiment has a thickness which is uniform from an inner circumferential portion 32e to an outer circumferential portion 32d as shown in FIG. 8(a). The thickness is substantially the same as the thickness of the thin part 32a of the first embodiment. In the cylindrical battery 3 of the present embodiment, as shown in FIG. 7, the inner circumferential portion 32e of the insulator 32 is in contact with an outer surface of a base of the protrusion 13a. In a battery unit 2 using the cylindrical batteries 3 of the present embodiment, the outer circumferential portion 32d of the insulator 32 is positioned between the negative electrode connecting plate 27 and the positive electrode connecting plate 33.

The present embodiment is merely different from the first embodiment in the thickness of the insulator 32. Therefore, the present embodiment can provide the advantages of the first embodiment. In addition, the thickness of the insulator 32 of the present embodiment is substantially uniform in the radial direction of the battery case 10, thereby allowing easy attachment of the insulator 32 to the protrusion 13a.

Other Embodiments

The outer diameter of the protrusion 13a may be uniform in the direction toward the inside of the battery case 10. When the inner circumferential portion 32e of the insulator 32 is in close contact with the outer circumferential surface 13b of the protrusion 13a like the first embodiment, the detaching of the insulator 32 from the protrusion 13a can be prevented even when the protrusion 13a has no restriction. When the inner circumferential portion 32e of the insulator 32 is in contact with the outer surface of the base of the protrusion 13a like the second embodiment, the detaching of the insulator 32 from the protrusion 13a can be prevented even when the protrusion 13a has no restriction. However, when the protrusion 13a has a portion having the smallest outer diameter, the inner circumferential portion 32e of the insulator 32 can be fitted to the portion, thereby significantly preventing the detaching of the insulator 32 from the protrusion 13a. Thus, the protrusion 13a preferably has a portion having the smallest outer diameter.

The portion of the protrusion 13a having the smallest outer diameter is not limited to the base of the protrusion 13a, and the portion may be provided at any part of the protrusion 13a in the longitudinal direction. Two or more portions having the smallest outer diameter may be provided in the longitudinal direction of the protrusion 13a. However, when the outer diameter of the protrusion 13a is gradually reduced in the direction toward the outside of the battery case 10, the detaching of the insulator 32 from the protrusion 13a cannot be prevented in some cases.

The position of the outer circumferential portion 32d of the insulator 32 is not limited to the position shown in FIG. 3 as long as the outer circumferential portion 32d is positioned radially inside the side surface of the battery case. However, in producing the battery unit 2 using the cylindrical batteries 3, the outer circumferential portion 32d of the insulator 32 is preferably flush with, or is positioned outside the side surface of the battery case. This can keep the insulation between the positive electrode connecting plate 33 and the negative electrode connecting plate 27.

In the first embodiment, the inner circumferential portion 32e of the insulator 32 is in close contact with the outer circumferential surface 13b of the protrusion 13a. Therefore, the shape of the inner circumferential portion 32e preferably corresponds to the shape of the outer circumferential surface 13b of the protrusion 13a.

In the first embodiment, the thick part 32b of the insulator 32 has a certain width. Therefore, a boundary between the thin part 32a and the thick part 32b is preferably positioned radially inside the opening end 10a of the battery case 10, and the position of the boundary is not limited to the position shown in FIG. 3.

In the first embodiment, the shape of the insulator 32 is not limited to the shape shown in FIG. 6(a). For example, the thickness of the thick part 32b of the insulator 32 may not be uniform in the radial direction of the battery case 10.

In the second embodiment, the shape of the insulator 32 is not limited to the shape shown in FIG. 8(a). For example, the inner circumferential portion 32e of the insulator 32 may not be in contact with part of the outer circumferential surface 13b of the protrusion 13a, but may be in close contact with the outer circumferential surface 13b of the protrusion 13a.

Needless to say, the number of the cylindrical batteries 3 constituting the battery unit 2 is not limited to 20, and the number of the battery unit 2 constituting the battery module is not limited to 7. The structure of the battery is not limited to the structure of the first embodiment. For example, the batteries may be cylindrical batteries, or rectangular batteries. The electrode group 11 may include a positive electrode and a negative electrode which are stacked with a separator interposed therebetween. The positive electrode of the electrode group 11 may be connected to the sealing plate 13 through a positive electrode current collector, and the negative electrode of the electrode group 11 may be connected to the battery case 10 through a negative electrode current collector. The cylindrical batteries 3 may be, for example, nonaqueous electrolyte secondary batteries, such as lithium ion secondary batteries.

INDUSTRIAL APPLICABILITY

As described above, the present invention is useful as power sources for mobile electronic devices, power sources for driving vehicles, or power sources for domestic power supply.

DESCRIPTION OF REFERENCE CHARACTERS

2 Battery unit (battery pack)
3 Cylindrical battery
10 Battery case
10a Opening end
13 Sealing plate (positive electrode)
13a Protrusion
13b Outer circumferential surface
32 Insulator
32a Thin part (extension part)
32b Thick part (fitting part)
32c Through hole
32d Outer circumferential portion
32e Inner circumferential portion

The invention claimed is:
1. A battery comprising:
a battery case having an opening sealed with a sealing plate, wherein
the sealing plate has a protrusion extending in a direction toward the outside of the battery case,
a ring-shaped insulator is provided on an outer circumferential surface of the protrusion,
an inner circumferential portion of the insulator is in contact with the outer circumferential surface of the protrusion,
an outer circumferential portion of the insulator is extended to be positioned on an opening end of the battery case, said outer circumferential portion of the insulator being disposed over sidewalls of the battery case,
the inner circumferential portion is fitted to part of the protrusion having the smallest outer diameter,
an outer diameter of the protrusion decreases in a direction toward a bottom surface of the battery case, and
the insulator has a thicker part extending from the inner circumferential portion toward the outer circumferential portion, an inner diameter of the thicker part decreases in the direction toward a bottom surface of the battery case, and an inner circumferential surface of the thicker part is in contact with the outer circumferential surface of the protrusion.
2. The battery of claim 1, wherein
a vent is formed in the protrusion, and
the vent is not blocked by the insulator.

3. The battery of claim 1, wherein the insulator has a thicker part extending from the inner circumferential portion toward the outer circumferential portion.

4. The battery of claim 1, wherein the insulator has a thickness which is uniform from the inner circumferential portion to the outer circumferential portion.

5. A battery unit comprising:
a plurality of the batteries of claim 1 connected in parallel, wherein
the battery cases and the sealing plates have different polarities,
the battery cases are connected in parallel through a first connecting plate,
the sealing plates are connected in parallel through a second connecting plate,
the first connecting plate and the second connecting plate are arranged adjacent the openings of the battery cases, and
the outer circumferential portion of the insulator is present between the first connecting plate and the second connecting plate.

6. The battery of claim 1, wherein said outer diameter of the protrusion continually decreases in the direction toward the bottom surface of the battery case for a portion of said protrusion.

7. The battery of claim 1, wherein said inner diameter of the thicker part of said insulator continually decreases in the direction toward the bottom surface of the battery case for a portion of said thicker part of said insulator.

8. A battery comprising:
a battery case having an opening sealed with a sealing plate, wherein
the sealing plate has a protrusion extending in a direction toward the outside of the battery case,
a ring-shaped insulator is provided on an outer circumferential surface of the protrusion,
an inner circumferential portion of the insulator is in contact with the outer circumferential surface of the protrusion,
an outer circumferential portion of the insulator is extended to be positioned on an opening end of the battery case, said outer circumferential portion of the insulator being disposed over sidewalls of the battery case,
the inner circumferential portion is fitted to part of the protrusion having the smallest outer diameter,
an outer diameter of the protrusion decreases in a direction toward a bottom surface of the battery case,
the insulator has a thickness which is uniform from the inner circumferential portion to the outer circumferential portion, and
the insulator has an inclined part extending from the inner circumferential portion toward the outer circumferential portion, an inner diameter of the inclined part decreases in the direction toward a bottom surface of the battery case, and an inner circumferential surface of the inclined part is in contact with the outer circumferential surface of the protrusion.

* * * * *